United States Patent
Stahlhut et al.

(10) Patent No.: US 7,047,743 B1
(45) Date of Patent: May 23, 2006

(54) ELECTRIC TURBO COMPOUND CONFIGURATION FOR AN ENGINE/ELECTRIC GENERATOR SYSTEM

(75) Inventors: Ronnie Dean Stahlhut, Bettendorf, IA (US); Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/079,804

(22) Filed: Mar. 14, 2005

(51) Int. Cl.
*F02G 5/02* (2006.01)

(52) U.S. Cl. .................. 60/608; 60/605.2; 60/612; 123/562; 290/52; 310/114

(58) Field of Classification Search ............ 60/597, 60/605.1, 608, 612, 624, 605.2; 123/562; 290/52, 4 R, 4 A, 4 C, 4 D; 310/114
See application file for complete search history.

(56) References Cited

U.S. PATENT DOCUMENTS

| | | | |
|---|---|---|---|
| 4,665,704 A | 5/1987 | Hartwig ............... | 60/597 |
| 4,694,654 A * | 9/1987 | Kawamura ............ | 60/597 |
| 4,756,377 A * | 7/1988 | Kawamura et al. ...... | 60/597 |
| 4,774,811 A * | 10/1988 | Kawamura ............ | 60/608 |
| 4,798,257 A * | 1/1989 | Kawamura et al. ...... | 60/608 |
| 4,805,409 A * | 2/1989 | Kobayashi ............ | 60/597 |
| 4,955,199 A * | 9/1990 | Kawamura ............ | 60/608 |
| 4,958,497 A * | 9/1990 | Kawamura ............ | 60/608 |
| 5,079,913 A * | 1/1992 | Kishishita ............ | 60/597 |
| 5,105,624 A * | 4/1992 | Kawamura ............ | 60/608 |
| 5,138,840 A * | 8/1992 | Oguchi et al. ......... | 60/597 |
| 5,881,559 A * | 3/1999 | Kawamura ............ | 60/597 |
| 6,286,312 B1 * | 9/2001 | Bertilsson ............ | 60/624 |
| 6,604,360 B1 * | 8/2003 | Vuk ................... | 60/597 |

OTHER PUBLICATIONS

Deere & Company, 3029 Generator Drive Engines, 2004, p. 1 of 1.
Bowman Power Group, Power Conditioners, 2004, p. 1 of 1.
AC Propulsion, AC-150 EV Power System, 2001, 4 pages.

\* cited by examiner

*Primary Examiner*—Sheldon J Richter

(57) ABSTRACT

An engine/electric generator system includes an internal combustion engine, a primary electric generator driven by an output shaft of the engine and providing electrical power. A turbocharger has a first turbine driven by exhaust gasses from the engine and a compressor driven by the first turbine and provides inlet air to the engine. The system also includes a secondary turbine, and an exhaust line which communicates exhaust gas from the first turbine to an input of the secondary turbine. A secondary electric generator is driven by the secondary turbine. An electric power combining circuit combines electric power from the primary electric generator and the secondary electric generator, and delivers combined electric power to a transmission line.

8 Claims, 2 Drawing Sheets

ELECTRIC TURBO COMPOUND CONFIGURATION FOR AN ENGINE/ELECTRIC GENERATOR SYSTEM

BACKGROUND

The present invention relates to an engine-powered electric generation system.

Traditional engine-powered electric generation systems ("gen sets") typically include a diesel engine driving an AC generator via a mechanical shaft. The engine is normally isochronized governor controlled. The generator is connected to supply electrical power to an AC power grid. All power delivered to the generator must be delivered through the engine output shaft. Thus, all components must be sized to handle the peak output of the generator.

It would be desirable to improve the fuel economy and operating costs of such an engine/generator system. It is also desirable to use the smallest possible engine in such a system in order to reduce product cost.

SUMMARY

Accordingly, an object of this invention is to increase the total electrical power output of an engine/generator system without increasing the size of the engine size.

This and other objects are achieved by the present invention, wherein an engine/electric generator system includes an internal combustion engine, and a primary electric generator which is driven by an output shaft of the engine and which provides electrical power to an electric power AC transmission line. The system includes a turbocharger having a first turbine driven by exhaust gasses from the engine and a compressor driven by the first turbine and providing inlet air to the engine. An exhaust line communicates exhaust gas from the first turbine to an inlet of a secondary turbine. A secondary electric generator is driven by the secondary turbine. The electrical power output of the secondary electric generator is combined with the power generated by the primary electric generator and delivered to an AC transmission line. This increases net efficiency of the system and increases the total output of the generator system.

DETAILED DESCRIPTION

Figure 1:
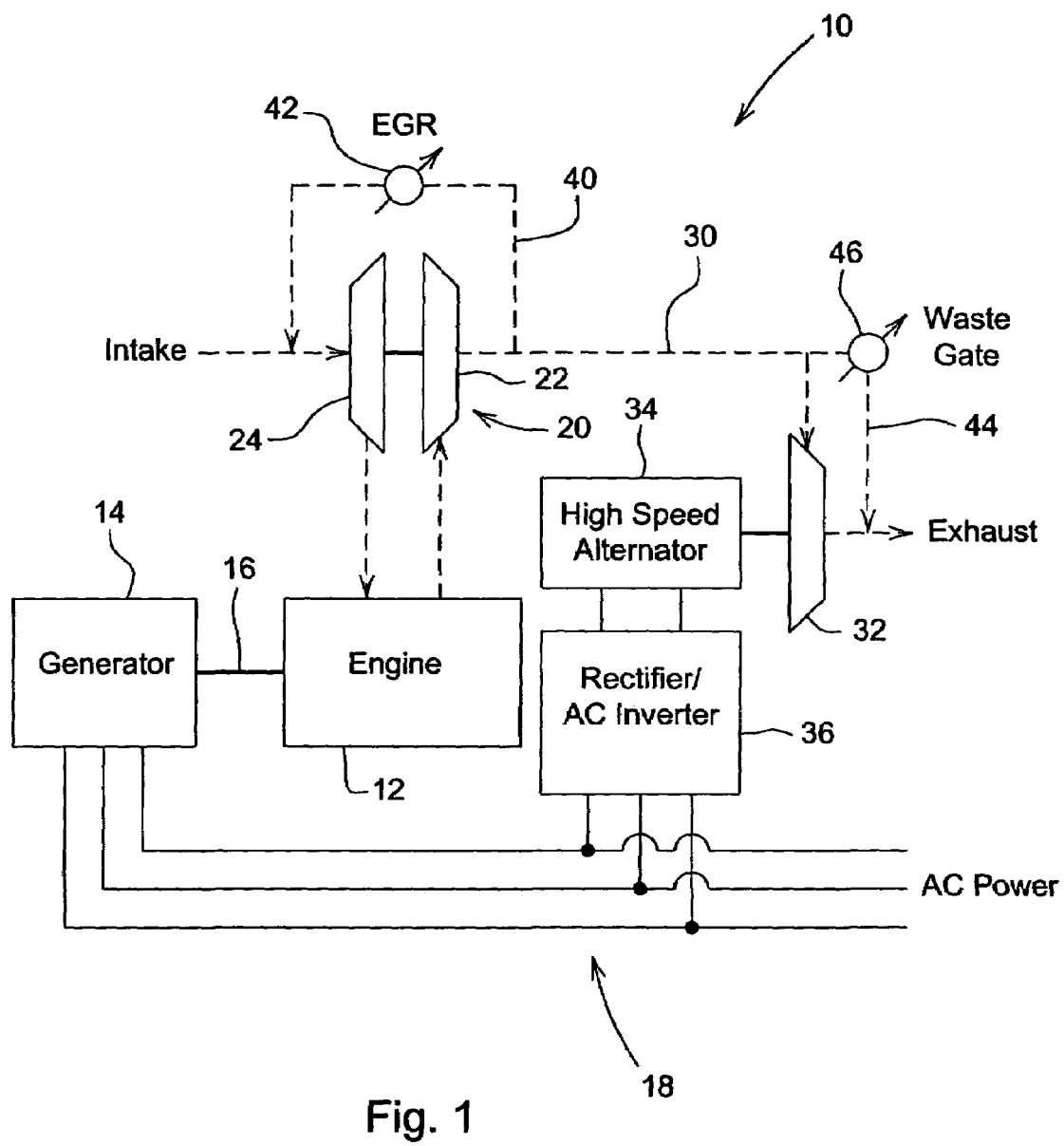
FIG. 1 is a simplified schematic diagram of an engine/electric generator system according to the present invention.

Referring to FIG. 1, an engine/electric generator system 10 includes an internal combustion engine 12, such as a Diesel engine and a primary conventional electric generator 14 driven by the output shaft 16 of the engine 12. The generator outputs electrical power on a set of electrical transmission lines 18. The engine/electric generator system 10 of FIG. 1 is preferably a common generator configuration with a "genset" engine using constant speed governor control.

A turbocharger 20 includes a first turbine 22 driven by exhaust gasses from the engine 12 and a compressor 24 driven by the first turbine 20 and providing inlet air to the engine 12.

An exhaust line 30 communicates exhaust gas from the first turbine 22 to a secondary turbine 32. A secondary electric generator or "turbo-generator" 34 is driven by the secondary turbine 32. The secondary generator 34 is preferably a high speed alternator. The secondary generator 34 provides electrical power to a rectifier/AC inverter 36. The rectifier/AC inverter 36 converts the electrical power from the generator 34 to a form or frequency which matches the power generated by generator 14 and transmits it onto the transmission lines 18. As a result, with the system of FIG. 1, the turbo-generator supplies rectified DC that is converted directly into AC power.

An exhaust gas recirculation line 40 communicates an output of the first turbine 22 to an input of the compressor 24, and a valve 42 in the exhaust gas recirculation line 40 controls the flow of exhaust gas recirculation therethrough.

A waste gate line 44 communicates the exhaust line 30 and the output of the first turbine 22 to the output of the secondary turbine 32, and a valve 46 in line 44 controls the flow of exhaust gas therethrough. A control unit (not shown) could be adapted to control valves 42 and 44 to control the output of the secondary turbine 32 as desired.

Figure 2:
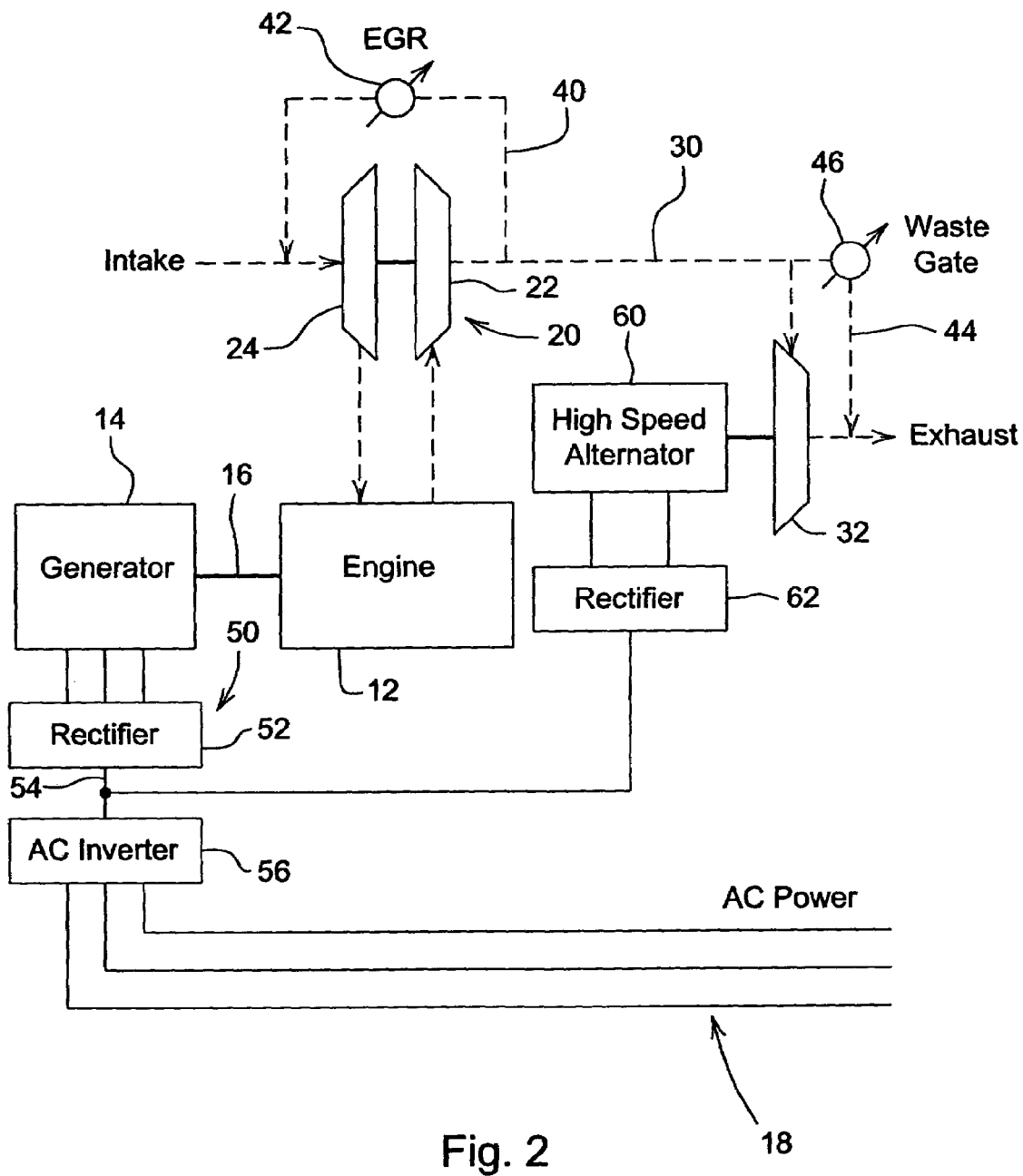
FIG. 2 is a simplified schematic diagram of an alternate embodiment of the present invention.

Referring now to FIG. 2, there is shown a "genset" configuration wherein the engine has a non-synchronous control (not shown) were the output of the primary generator is rectified to DC and combined with the Turbo Generator DC on a common DC bus, then rectified into AC power. In the FIG. 2 embodiment the generator 14 provides 3-phase electrical power to an electrical unit 50 which includes a rectifier 52, a DC bus 54 and an AC inverter 56. Bus 54 connects the rectifier 52 to the inverter 56.

The secondary turbine 32 drives a high speed alternator or "turbo-generator" 60 which provides 3-phase electric power to a rectifier 62. Rectifier 62 provides DC power to the DC bus 54 so that the combined power from rectifiers 52 and 62 is supplied to AC inverter 56, and so that the combined power is supplied to the transmission line 18.

The AC inverter then provides AC electrical power on lines 18.

With this system exhaust energy is converted into electric power and placed on the electric power transmission lines independent of a mechanical connection with the engine shaft. This increases the total electrical power output, without increasing the size of the engine size, thus improving fuel efficiency. For a given generator output, a reduced engine size may be achieved. In other words, in the system of FIG. 2 the output of the primary generator 14 is rectified to DC and combined with the DC power from the turbo-generator 60 on a common DC bus, then rectified or converted into AC power.

Thus, with the systems of both FIG. 1 and FIG. 2, the output of the turbo-generator is combined with the output of the engine powered generator. This permits maximization of power output for a given engine size, and optimization of total system efficiency.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the claims.

We claim:

1. An engine/electric generator system, comprising:
   an internal combustion engine;
   a primary electric generator driven by an output shaft of the engine and providing electrical power;

a turbocharger having a first turbine driven by exhaust gasses from the engine and a compressor driven by the first turbine and providing inlet air to the engine;

a secondary turbine;

an exhaust line communicating exhaust gas from the first turbine to an input of the secondary turbine;

a secondary electric generator driven by the secondary turbine; and electric power combining circuit for combining electric power from the primary electric generator and the secondary electric generator, and delivering combined electric power to a transmission line; and an exhaust gas recirculation line communicating an output of the first turbine to an input of the compressor.

2. The engine/electric generator system of claim 1, further comprising:

a valve in the exhaust gas recirculation line controlling flow of gasses therethrough.

3. An engine/electric generator system, comprising:

an internal combustion engine;

a primary electric generator driven by an output shaft of the engine and providing electrical power;

a turbocharger having a first turbine driven by exhaust gasses from the engine and a compressor driven by the first turbine and providing inlet air to the engine;

a secondary turbine;

an exhaust line communicating exhaust gas from the first turbine to an input of the secondary turbine;

a secondary electric generator driven by the secondary turbine; and electric power combining circuit for combining electric power from the primary electric generator and the secondary electric generator, and delivering combined electric power to a transmission line; and a waste gate line communicating the exhaust line to an output of the secondary turbine.

4. The engine/electric generator system of claim 3, further comprising:

a valve in the waste gate line for controlling flow of gasses therethrough.

5. An engine/electric generator system, comprising:

an internal combustion engine;

a primary electric generator driven by an output shaft of the engine and providing electrical power;

a turbocharger having a first turbine driven by exhaust gasses from the engine and a compressor driven by the first turbine and providing inlet air to the engine;

a secondary turbine;

an exhaust line communicating exhaust gas from the first turbine to an input of the secondary turbine;

a secondary electric generator driven by the secondary turbine, the secondary generator comprising a high speed alternator which generates AC electrical power; and electric power combining circuit for combining electric power from the primary electric generator and the secondary electric generator, and delivering combined electric power to a transmission line, the electric power combining circuit comprising a primary rectifier which receives AC electric power from the primary generator, a secondary rectifier which receives AC electric power from the alternator, a DC bus which receives DC power from the primary and secondary rectifiers, and an AC inverter which receives DC electrical power from the DC bus and which provides AC electric power to the transmission line.

6. The engine/electric generator system of claim 5, wherein:

the primary electric generator provides electrical power to the transmission line; and the electric power combining circuit comprises a rectifier/AC inverter receiving electric power from the secondary electric generator, and delivering electric power to the transmission line.

7. The engine/electric generator system of claim 5, wherein:

the secondary electric generator comprises a high speed alternator.

8. An engine/electric generator system, comprising:

an internal combustion engine;

a primary electric generator driven by an output shaft of the engine and providing electrical power;

a primary rectifier receiving AC electric power from the primary generator;

a turbocharger having a first turbine driven by exhaust gasses from the engine and a compressor driven by the first turbine and providing inlet air to the engine;

a secondary turbine;

an exhaust line communicating exhaust gas from the first turbine to an input of the secondary turbine;

a high speed alternator driven by the secondary turbine, the alternator generating AC electrical power;

a secondary rectifier receiving AC electric power from the alternator;

a DC bus receiving and combining DC power from the primary and secondary rectifiers; and an AC inverter receiving DC electrical power from the DC bus and providing AC electric power to a transmission line.

* * * * *